(12) United States Patent
Oyama et al.

(10) Patent No.: US 11,965,557 B2
(45) Date of Patent: Apr. 23, 2024

(54) ROLLING BEARING FOR AIR TURBINE

(71) Applicant: NSK LTD., Tokyo (JP)

(72) Inventors: Takuya Oyama, Fujisawa (JP); Hironori Suzuki, Fujisawa (JP)

(73) Assignee: NSK LTD., Tokyo (JP)

( * ) Notice: Subject to any disclaimer, the term of this patent is extended or adjusted under 35 U.S.C. 154(b) by 159 days.

(21) Appl. No.: 17/789,003

(22) PCT Filed: Dec. 25, 2020

(86) PCT No.: PCT/JP2020/049026
§ 371 (c)(1),
(2) Date: Jun. 24, 2022

(87) PCT Pub. No.: WO2021/132688
PCT Pub. Date: Jul. 1, 2021

(65) Prior Publication Data
US 2023/0046260 A1    Feb. 16, 2023

(30) Foreign Application Priority Data

Dec. 27, 2019 (JP) .................................. 2019-238708
Dec. 27, 2019 (JP) .................................. 2019-238709

(51) Int. Cl.
*F16C 33/78* (2006.01)
*F16J 15/32* (2016.01)
*F16J 15/3228* (2016.01)

(52) U.S. Cl.
CPC ...... *F16C 33/7826* (2013.01); *F16C 33/7823* (2013.01); *F16C 33/783* (2013.01);
(Continued)

(58) Field of Classification Search
CPC ................ F16C 33/7826; F16C 33/783; F16C 33/7843; F16C 33/7846; F16C 33/7853;
(Continued)

(56) References Cited

U.S. PATENT DOCUMENTS

| | | | | | |
|---|---|---|---|---|---|
| 2,861,824 | A | * | 11/1958 | Wurzel | ................ F16B 21/183 24/1 |
| 2020/0149590 | A1 | | 5/2020 | Nakahara et al. | |
| 2021/0186654 | A1 | | 6/2021 | Nakahara et al. | |

FOREIGN PATENT DOCUMENTS

| EP | 3 428 468 A1 | 1/2019 |
|---|---|---|
| JP | 2016-129149 A | 7/2016 |

(Continued)

OTHER PUBLICATIONS

Extended European Search Report dated Jan. 12, 2023, issued by the European Patent Office in counterpart European Patent Application No. 20906478.1.
(Continued)

*Primary Examiner* — Alan B Waits
(74) *Attorney, Agent, or Firm* — Sughrue Mion, PLLC (57) ABSTRACT

A rolling bearing includes an outer ring, an inner ring, a plurality of rolling bodies, and a seal member. An outer peripheral portion of the seal member is fixed by a retaining ring to a groove portion formed on an inner peripheral surface of the outer ring and an inner peripheral portion of the seal member is elastically deformable. The seal member includes an inclined portion. $1 \leq Ts/Sct \leq 10$ is satisfied when Ts is a circumferential gap of the retaining ring at a time when the seal member and the retaining ring are attached to the groove portion of the outer ring and Sct is an axial thickness of a part of the seal member in contact with the retaining ring.

4 Claims, 4 Drawing Sheets

(52) U.S. Cl.
CPC ....... *F16C 33/7856* (2013.01); *F16J 15/3228* (2013.01); *F16C 2316/13* (2013.01)

(58) Field of Classification Search
CPC ................ F16C 33/7856; F16C 43/045; F16C 2226/50; F16C 2226/74; F16C 2316/13; F16J 15/3228; F16J 15/3268; F16B 21/183; A61C 1/05; A61C 1/181
See application file for complete search history.

(56) References Cited

FOREIGN PATENT DOCUMENTS

| | | | | |
|---|---|---|---|---|
| JP | 2017-211076 A | 11/2017 | | |
| JP | 2018-13230 A | 1/2018 | | |
| WO | WO-2017051880 A1 * | 3/2017 | | |
| WO | WO-2017154935 A1 * | 9/2017 | ............... | A61C 1/05 |
| WO | WO-2017213042 A1 * | 12/2017 | | |

OTHER PUBLICATIONS

Communication dated Nov. 11, 2022 by the Indian Patent Office for Indian Patent Application No. 202217036761.
International Search Report dated Mar. 23, 2021 issued by the International Searching Authority in counterpart International Application No. PCT/JP2020/049026 (PCT/ISA/210).
International Written Opinion dated Mar. 23, 2021 issued by the International Searching Authority in counterpart International Application No. PCT/JP2020/049026 (PCT/ISA/237).

* cited by examiner

ROLLING BEARING FOR AIR TURBINE

This application is a National Stage of International Application No. PCT/JP2020/049026 filed Dec. 25, 2020, claiming priority based on Japanese Patent Application No. 2019-238708, filed Dec. 27, 2019, and Japanese Patent Application No. 2019-238709, filed Dec. 27, 2019, the contents of all of which are incorporated herein by reference in their entirety.

TECHNICAL FIELD

The present invention relates to a rolling bearing for an air turbine.

BACKGROUND ART

Figure 4:
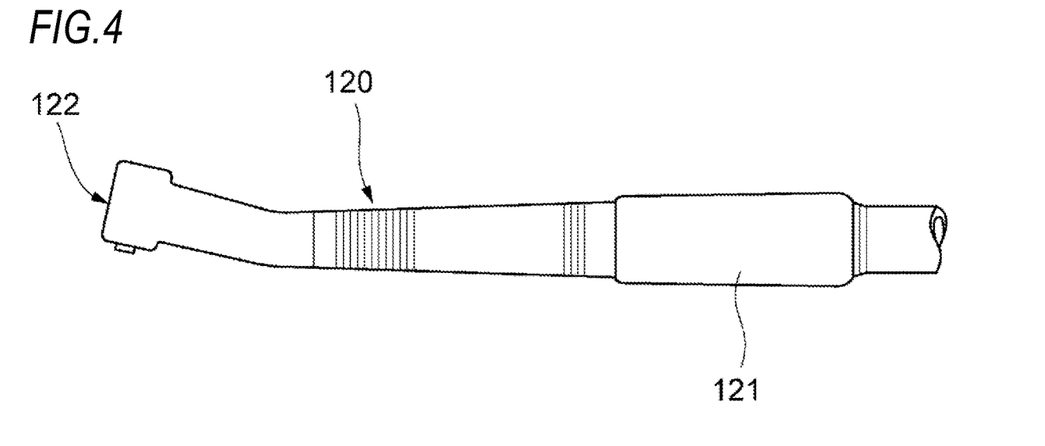
FIG. 4 is a schematic side view of a dental air turbine handpiece.

Small and lightweight air turbine handpieces are often used in dental treatment. A dental air turbine handpiece 120 as an example is illustrated in FIG. 4. The dental air turbine handpiece 120 includes a grip portion 121 and a head portion 122 provided in the tip portion of the grip portion 121. A surgeon holds the grip portion 121 and performs, for example, tooth cutting.

Figure 5:
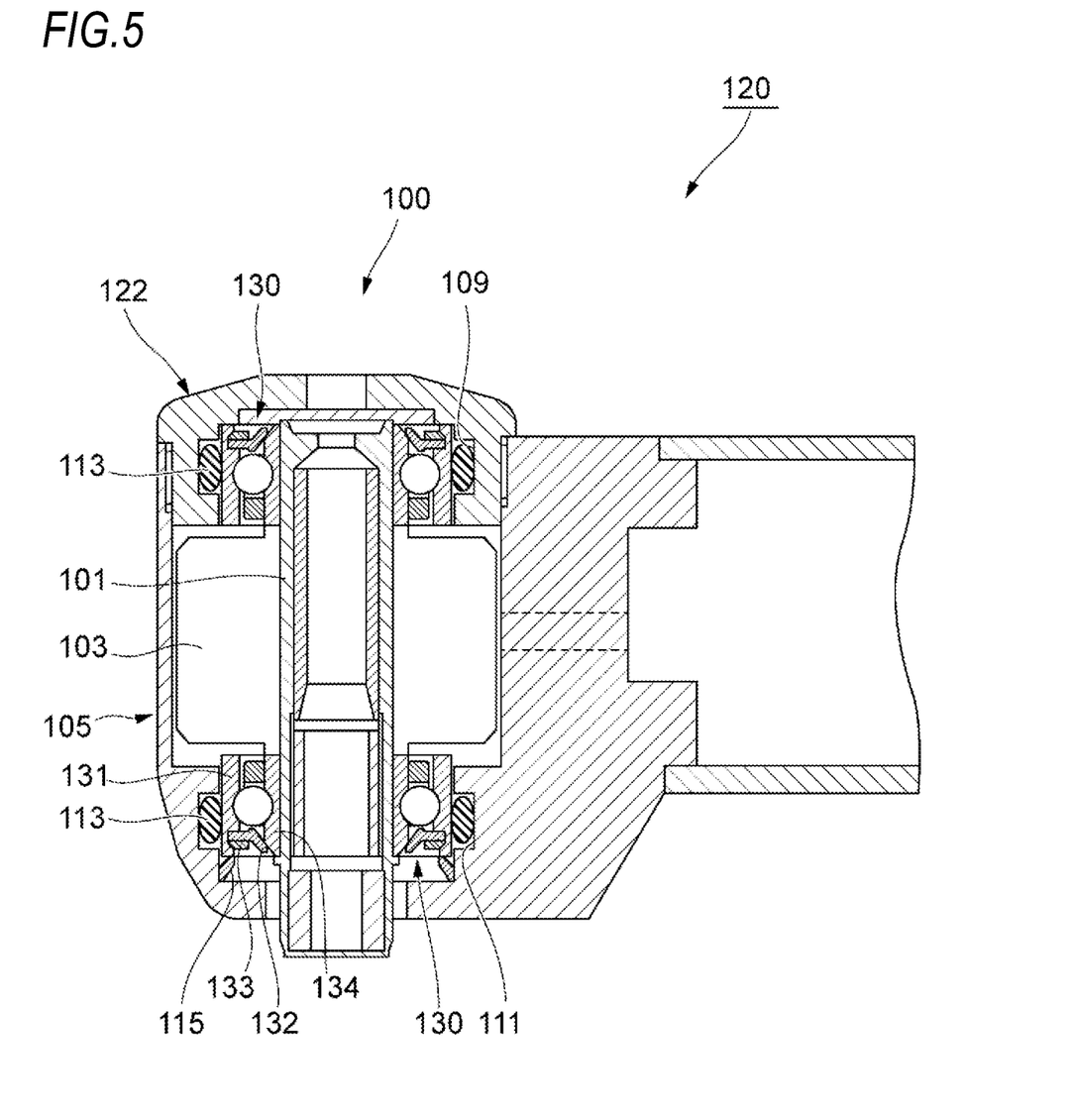
FIG. 5 is a cross-sectional view of a main part of the dental air turbine handpiece illustrated in FIG. 4.

As illustrated in FIG. 5, in this type of air turbine handpiece 120, a rotary shaft 101 having a turbine blade 103 receiving compressed air from an air supply port is rotatably stored in a housing 105 having the air supply port and an air discharge port. The rotary shaft 101 is supported by the housing 105 so as to be rotatable at a high speed via a pair of rolling bearings 130. Tooth cutting or the like is performed by a surgeon operating the air turbine handpiece 120 while rotating a therapeutic tool attached to the rotary shaft 101 at a high speed.

The rolling bearings 130 are supported by the housing 105 via rubber rings 113 mounted in annular recesses 109 and 111 of the housing 105. In addition, one of the rolling bearings 130 is urged to the other rolling bearing 130 side by a spring washer 115.

In the rolling bearing 130 described in Patent Literature 1, a seal member 132 is fixed by a retaining ring 133 to the groove portion formed on the inner peripheral surface of an outer ring 131, has an inclined portion inclined to the outside in an axial direction as an inner peripheral portion is directed toward an inner diameter side, and can be elastically deformed in the axial direction or a radial direction of a bearing.

The inner peripheral portion of the seal member 132 comes into or out of contact with the outer peripheral surface of an inner ring 134 depending on the presence and absence of compressed air. As a result, it is possible to achieve both ultra-high speed rotation and quick stop with this configuration.

CITATION LIST

Patent Literature

Patent Literature 1: JP-A-2017-211076

SUMMARY OF INVENTION

Technical Problem

In the rolling bearing for an air turbine handpiece, a circumferential gap is formed between both circumferential end portions of the retaining ring when the seal member and the retaining ring are attached to the groove portion of the outer ring and it is required to prevent the seal member from floating due to this gap and prevent the seal member from coming off from the groove portion of the outer ring when compressed air is supplied.

The present invention has been made in view of the above circumstances, and an object of the present invention is to provide a rolling bearing for an air turbine with which it is possible to prevent a seal member from floating due to the circumferential gap formed between both circumferential end portions of a retaining ring and prevent the seal member from coming off from the groove portion of an outer ring when compressed air is supplied.

Solution to Problem

The above object of the present invention is achieved by the following configuration.

(1) A rolling bearing for an air turbine including:
an outer ring;
an inner ring;
a plurality of rolling bodies rollably disposed between the outer ring and the inner ring; and
a substantially annular seal member provided in one axial end portion of a bearing internal space between the outer ring and the inner ring and made of an elastic body without a core metal, in which
an outer peripheral portion of the seal member is fixed by a retaining ring to a groove portion formed on an inner peripheral surface of the outer ring in the one axial end portion and an inner peripheral portion of the seal member is elastically deformable,
the one axial end portion is on a side opposite to an inlet of compressed air supplied to the bearing internal space,
the seal member includes an inclined portion inclined toward one axial end portion side on an inner diameter side, and
$1 \leq Ts/Sct \leq 10$ is satisfied when Ts is a circumferential gap of the retaining ring at a time when the seal member and the retaining ring are attached to the groove portion of the outer ring and Sct is an axial thickness of a part of the seal member in contact with the retaining ring.

(2) The rolling bearing for an air turbine according to Claim 1, in which $0.018 \leq Lss/\Phi dg \leq 0.093$ is satisfied when $\Phi dg$ is an inner diameter of the outer ring and Lss is a radial length at which both axial side surfaces of the seal member are in contact with and sandwiched between the retaining ring and the groove portion of the outer ring.

Advantageous Effects of Invention

According to the rolling bearing for an air turbine of the present invention, it is possible to prevent the seal member from floating due to the circumferential gap formed between both circumferential end portions of the retaining ring and prevent the seal member from coming off from the groove portion of the outer ring when compressed air is supplied.

DESCRIPTION OF EMBODIMENTS

Hereinafter, embodiments of a rolling bearing for an air turbine according to the present invention will be described in detail with reference to the drawings.

Figure 1:
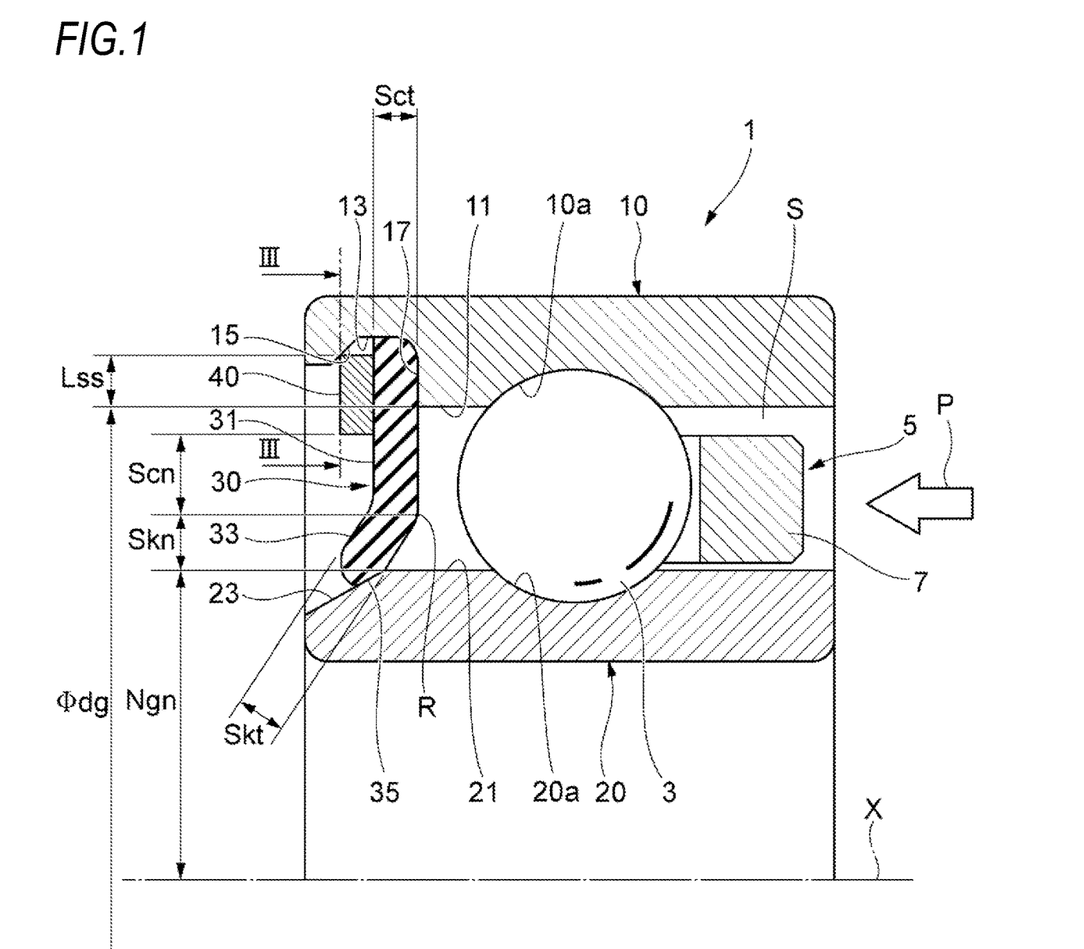
FIG. 1 is a partial cross-sectional view illustrating a state where a rolling bearing of one embodiment of the present invention is stopped.

FIG. 1 is a partial cross-sectional view illustrating a state where a rolling bearing of a first embodiment is stopped.

A rolling bearing 1 is a ball bearing including an outer ring 10 having an outer ring raceway surface 10a, an inner ring 20 having an inner ring raceway surface 20a, a plurality of balls (rolling bodies) 3 rollably disposed between the outer ring 10 and the inner ring 20, and a cage 5 rollably holding the plurality of balls 3. The present invention is not limited to the ball bearing in the illustrated example and may be an angular-type ball bearing.

The cage 5 is a so-called crown-type cage. As for the cage 5, a substantially circular ring-shaped rim portion 7 is positioned on an upstream side from the ball 3 in a compressed air supply direction, that is, on the right side in FIG. 1. The arrow P in the drawing indicates the direction in which the compressed air flows.

A circular ring-shaped seal member 30 is provided between the outer ring 10 and the inner ring 20. The seal member 30 is made of an elastic body configured from only an elastic material without a core metal. The outer peripheral portion of the seal member 30 is fixed by a retaining ring 40 to a groove portion 13 formed on the inner peripheral surface of the outer ring 10, and the inner peripheral portion can be elastically deformed in an axial direction and a radial direction of a bearing.

A water-resistant acrylic rubber with a Shore A hardness (JIS K 6253) of 60 to 90, a general water-resistant fluoro-rubber with a Shore A hardness of 60 to 90, or the like can be used as an elastic member by which the seal member 30 is configured. By using the above material for the seal member 30, appropriate elastic properties can be obtained and durability and wear resistance are also improved.

The seal member 30 is provided on a downstream side from the ball 3 in the compressed air supply direction, that is, on the left side in FIG. 1. In other words, the seal member 30 is provided in one axial end portion on the side of a bearing internal space S opposite to a compressed air supply side (compressed air inlet). The groove portion 13 fixing the seal member 30 is formed on an inner peripheral surface 11 of the outer ring 10. The seal member 30 is fixed to the groove portion 13 by the retaining ring 40. The shape of the seal member 30 is not limited to the circular ring shape. The seal member 30 may have another shape insofar as the shape is substantially annular as described later.

An outer peripheral surface 21 of the inner ring 20 has an inclined surface 23 in the end portion on the downstream side in the compressed air supply direction, that is, on the left side in FIG. 1. The inclined surface 23 may be cylindrical although it is preferable that the inclined surface 23 is formed in a circular ring shape (conical surface shape) inclined from a large diameter to a small diameter toward the axial end on the seal member side in the axial direction.

Figure 2:
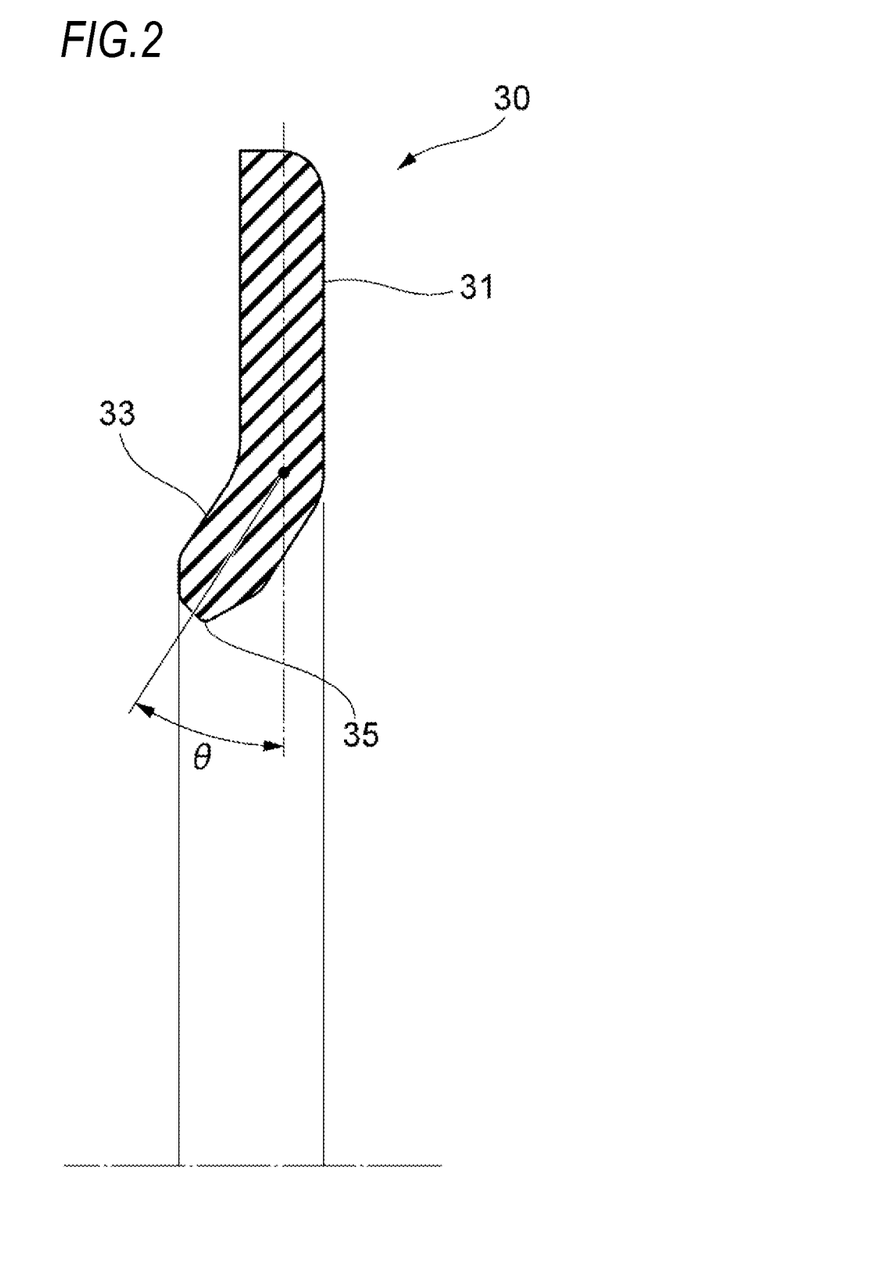
FIG. 2 is a cross-sectional view of a seal member illustrated in FIG. 1.

FIG. 2 is a cross-sectional view of the seal member illustrated in FIG. 1.

The seal member 30 has a circular ring-shaped base portion 31 extending in the radial direction and an inclined portion 33 integrally formed inside the base portion 31 in the radial direction and inclined toward one axial end side with respect to the base portion 31. An inclination angle θ of the inclined portion 33 with respect to the base portion 31 of the seal member 30, that is, the angle formed by the radial direction of the base portion 31 and an extension direction of the inclined portion 33 is 10° to 80°. The inclination angle θ that is smaller than the above range results in an excessive contact resistance. In a case where the inclination angle θ is larger than the above range, the flow resistance of the compressed air becomes excessive. The inclination angle θ is preferably 20° to 60° and more preferably 25° to 50°.

As illustrated in FIG. 1, the base portion 31 is inserted into the groove portion 13 together with the retaining ring 40 and fixed to the groove portion 13. The groove portion 13 has a tapered surface 15 that is inclined to the outside in the radial direction, increases in diameter toward the inside in the axial direction and is in contact with the retaining ring 40 and an axial inside surface 17 that is in contact with an axial side surface of the base portion 31 inside the tapered surface 15 in the axial direction. The outer diameter side end portion of the retaining ring 40 is in line contact with the tapered surface 15 along the circumferential direction. The retaining ring 40 is made of the elastic member urged outward in the radial direction, and thus a force is generated to press the seal member 30 to the inside in the axial direction. As a result, the base portion 31 is strongly sandwiched between the retaining ring 40 and the axial inside surface 17 and the seal member 30 is firmly fixed to the outer ring 10. The retaining ring 40 may have a circular cross section in addition to a rectangular cross section. In addition, the retaining ring 40 may be provided with an inclined surface, the groove portion 13 may have a rectangular cross section, and a corner portion of the groove portion 13 having the rectangular cross section may be pressed against the inclined surface of the retaining ring 40.

The inclined portion 33 is inclined to the downstream side in the compressed air supply direction (outside in the axial direction) toward the inside in the radial direction and is capable of being in contact with the inclined surface 23 of the inner ring 20. An inner peripheral surface 35 of the inclined portion 33 has a circular ring shape (conical surface shape). The inclined surface 23 of the inner ring 20 with which the inclined portion 33 is capable of being in contact also has a circular ring shape (conical surface shape). Accordingly, the inner peripheral surface 35 of the inclined portion 33 is capable of being in contact with the inclined surface of the inner ring 20 over an entire circumference. In other words, the seal member 30 is capable of sealing the bearing internal space S between the inner peripheral surface 11 of the outer ring 10 and the outer peripheral surface 21 of the inner ring 20 over the entire circumference.

As illustrated in FIG. 1, the supplied compressed air flows into the bearing internal space S and the pressure of the compressed air acts on the seal member 30. Then, the inclined portion 33 is elastically deformed toward the downstream side of the flow of the compressed air. As a result, a contact area between the inner peripheral surface 35 of the inclined portion 33 and the inclined surface 23 of the inner ring 20 becomes smaller than in a case where the pressure of the compressed air does not act. In other words, the state of the inclined portion 33 becomes an open state where compressed air communication is allowed.

Since the seal member 30 does not have a core metal and is made of only an elastic material, the seal member 30 has a structure that is elastically deformed with ease as a whole. In particular, the inclined portion 33 does not interfere with the retaining ring 40 at all, and thus the seal member 30 is supported by the outer ring 10 so as to be elastically deformed with ease. Accordingly, when the compressed air acts on the seal member 30 beyond a specific pressure, the inner peripheral portion of the seal member 30 is elastically deformed toward the outside in the axial direction and the contact area between the inner peripheral surface 35 of the inclined portion 33 and the inclined surface 23 of the inner ring 20 decreases.

As described above, in this configuration, the inclined portion 33 of the seal member 30 is elastically deformed with reliability and the contact area can be reduced even in a case where the supply pressure of the compressed air is relatively small.

As a result, an air turbine can be started smoothly, the frictional resistance between the seal member 30 and the inner ring 20 can be reduced, and a rotary shaft 101 can be rotated at an ultra-high speed rotation of approximately 400,000 $min^{-1}$. Further, since the inclined surface 23 is provided on the end portion of the outer peripheral surface 21 of the inner ring 20 on the downstream side in the compressed air supply direction, the flow of the compressed air passing between the inclined portion 33 and the inclined surface 23 is smooth and the ultra-high speed rotation even faster than that of the related art can be realized.

Figure 3:
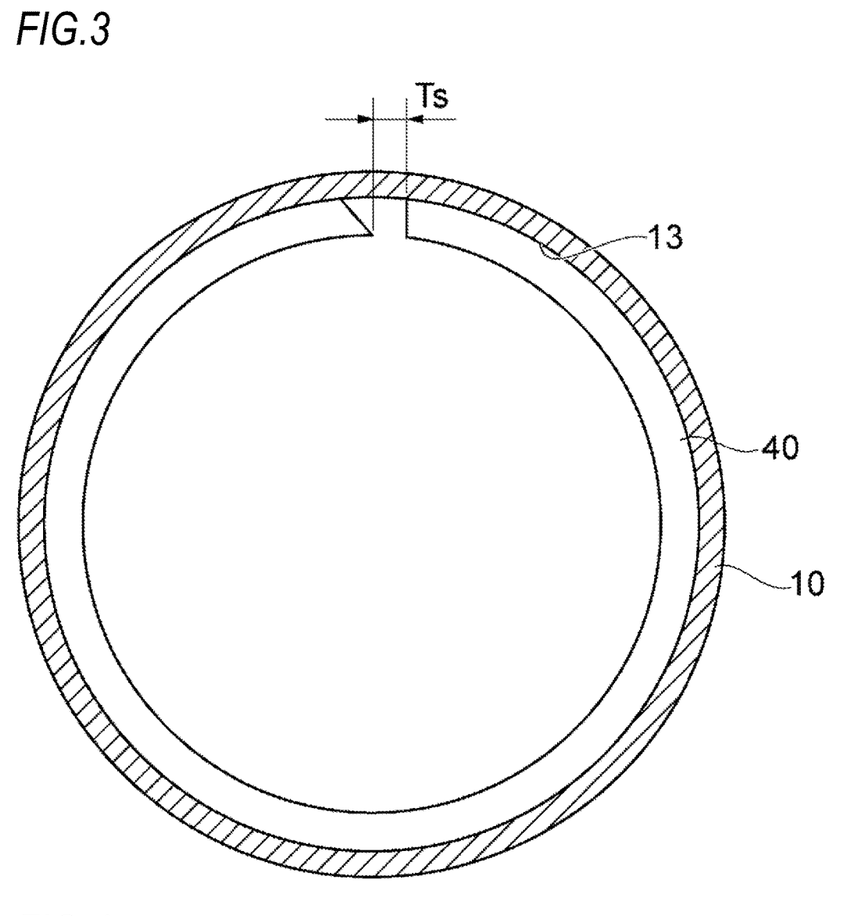
FIG. 3 is a cross-sectional view taken along line III-III of FIG. 1, illustrating a retaining ring inserted in an outer ring over an entire circumference.

In addition, as illustrated in FIGS. 1 to 3, the ratio of Ts to Set satisfies the following expression (1) when Ts is a circumferential gap of the retaining ring 40 at a time when the seal member 30 and the retaining ring 40 are attached to the groove portion 13 of the outer ring 10 and Set is an axial thickness of a part of the seal member 30 in contact with the retaining ring 40.

$$1 \leq Ts/Sct \leq 10 \quad (1)$$

By Ts/Sct being 10 or less, it is possible to prevent the seal member 30 from floating from the circumferential gap Ts of the retaining ring 40 and prevent the seal member 30 from coming off from the groove portion 13 of the outer ring 10 when the compressed air is supplied. Accordingly, Ts/Sct is preferably 6 or less and more preferably 5 or less.

When Ts/Sct is less than 1, both circumferential end portions are in contact with each other when the retaining ring 40 is reduced in diameter and the retaining ring 40 cannot be sufficiently reduced in diameter. Accordingly, Ts/Sct may be 1 or more, is preferably 2 or more, and is more preferably 2.5 or more.

In addition, the following expression (2) is satisfied when $\Phi dg$ is an inner diameter of the outer ring 10 and Lss is a radial length at which both axial side surfaces of the base portion 31 of the seal member 30 are in contact with and sandwiched between the retaining ring 40 and the axial inside surface 17 of the groove portion 13 of the outer ring 10 in a state where the seal member 30 is fixed to the groove portion 13 of the outer ring 10 by the retaining ring 40.

$$0.018 \leq Lss/\Phi dg \leq 0.093 \quad (2)$$

By Lss/$\Phi$dg being 0.018 or more, it is possible to ensure a radial length at which the base portion 31 of the seal member 30 is sandwiched between the retaining ring 40 and the groove portion 13 of the outer ring 10 and it is possible to reliably prevent the seal member 30 from coming off from the groove portion 13 of the outer ring 10 when the compressed air is supplied. Lss/$\Phi$dg is preferably 0.027 or more and more preferably 0.035 or more in order to more reliably prevent the seal member 30 from coming off from the groove portion 13 of the outer ring 10 when the compressed air is supplied.

In addition, by Lss/$\Phi$dg being 0.093 or less, the seal member 30 can be appropriately opened and closed by the compressed air. From the above viewpoint, Lss/$\Phi$dg is preferably 0.074 or less and more preferably 0.047 or less.

In the present embodiment, with the seal member 30 fixed to the groove portion 13 of the outer ring 10 by the retaining ring 40, an inner diameter of the retaining ring 40 is smaller than the inner diameter of the outer ring 10 and an inner peripheral surface of the retaining ring 40 is positioned closer to an inner diameter side than the inner peripheral surface of the outer ring 10.

In addition, as illustrated in FIG. 1, the seal member 30 is formed such that the following expression (3) is satisfied when Skn is a radial length from an inclination start part R of the inclined portion 33 on the inside in the axial direction to the outermost diameter position of a part of contact of the seal member 30 with the outer peripheral surface 21 of the inner ring 20 and Skt is a thickness of the inclined portion 33 in a direction perpendicular to an inclination direction.

$$0.25 \leq Skn/Skt \leq 2.5 \quad (3)$$

By Skn/Skt being 0.25 or more, the length of the inclined portion 33 that receives the compressed air can be ensured, the seal member 30 can be brought into contact with the outer peripheral surface 21 of the inner ring 20 at an appropriate angle, the inclined portion 33 is also deformed with ease, and thus the seal member 30 is easy to come out of contact with the outer peripheral surface 21 of the inner ring 20 even with a small compressed air amount. Skn/Skt is preferably 0.65 or more and more preferably 0.90 or more for the seal member 30 to come out of contact with the outer peripheral surface 21 of the inner ring 20 with greater ease.

In a case where Skn/Skt is larger than 2.5, the length of the inclined portion 33 is too long and a force of pressing against the outer peripheral surface 21 of the inner ring 20 is large or it is difficult to make contact at an appropriate angle. As a result, it is difficult for the seal member 30 to come out of contact with the outer peripheral surface 21 of the inner ring 20 with a small compressed air amount. Accordingly, Skn/Skt may be 2.5 or less, is preferably 2.1 or less, and is more preferably 1.75 or less.

In the present embodiment, the outermost diameter position of the part of contact of the seal member 30 with the outer peripheral surface 21 of the inner ring 20 is the boundary part between the inclined surface 23 and the cylindrical surface on the outer peripheral surface 21 of the inner ring 20. Alternatively, the outermost diameter position may be an intermediate part of the inclined surface 23.

In addition, in the present embodiment, the axial thickness Set of the part of the seal member 30 in contact with the retaining ring 40, that is, the base portion 31 may be equal to or different from the thickness Skt of the inclined portion 33 in the direction perpendicular to the inclination direction.

The seal member 30 is formed such that the ratio of the radial length Skn to Scn satisfies the following expression (4) when Scn is a radial length between the inclination start part R of the inclined portion 33 on the inside in the axial direction and the inner diameter of the retaining ring 40 at a time when the seal member 30 and the retaining ring 40 are attached to the groove portion 13 of the outer ring 10.

$$0.21 \leq Skn/Scn \leq 4.7 \quad (4)$$

By Skn/Scn being 0.21 or more, the length of the inclined portion 33 that receives the compressed air can be ensured between the inner diameter of the retaining ring 40 and the outer peripheral surface 21 of the inner ring 20, the seal member 30 can be brought into contact with the outer peripheral surface 21 of the inner ring 20 at an appropriate angle, and thus the seal member 30 is easy to come out of contact with the outer peripheral surface 21 of the inner ring 20 even with a small compressed air amount. Skn/Scn is preferably 0.42 or more for the seal member 30 to easily come out of contact with the outer peripheral surface 21 of the inner ring 20.

In a case where Skn/Scn is larger than 4.7, the length of the inclined portion 33 is too long and the seal member 30 cannot be brought into contact with the outer peripheral surface 21 of the inner ring 20 at an appropriate angle. As a result, it is difficult for the seal member 30 to come out of contact with the outer peripheral surface 21 of the inner ring 20 with a small compressed air amount. Accordingly, Skn/Scn may be 4.7 or less and is preferably 1.6 or less.

The ratio of the radial length Skn to Ngn satisfies the following expression (5) when Ngn is a radial length between the outermost diameter position of the part of contact of the seal member 30 with the outer peripheral surface 21 of the inner ring 20 and an axial center X of the rolling bearing 1.

$$0.025 \leq Skn/Ngn \leq 0.25 \quad (5)$$

By satisfying the expression (5), the length of the inclined portion 33 that receives the compressed air can be ensured even in the case of a bearing that has a predetermined dimension and the seal member 30 can be brought into contact with the outer peripheral surface 21 of the inner ring 20 at an appropriate angle. Accordingly, the seal member 30 is easy to come out of contact with the outer peripheral surface 21 of the inner ring 20 even with a small compressed air amount. $0.065 \leq Skn/Ngn \leq 0.21$ is preferable and $0.090 \leq Skn/Ngn \leq 0.18$ is more preferable for the seal member 30 to easily come out of contact with the outer peripheral surface 21 of the inner ring 20.

The pressure of the compressed air acting on the inclined portion 33 decreases when the supply of compressed air to the turbine blade 103 is stopped by stopping driving a dental air turbine handpiece 200. Then, the inclined portion 33 returns to the state illustrated in FIG. 1 and the inner peripheral surface 35 of the inclined portion 33 comes into contact with the inclined surface 23 of the inner ring 20 over the entire circumference. In other words, the inclined portion 33 is closed and functions as a brake for the inner ring 20. In this case, the inner peripheral surface 35 of the inclined portion 33 comes into contact with the inclined surface 23 of the inner ring 20 over the entire circumference, and thus the maximum brake effect attributable to the frictional resistance between the seal member 30 and the inner ring 20 can be obtained. As a result, it is possible to stop the rotary shaft 101 fixed to the inner ring 20 most quickly.

In addition, since the inclined portion 33 of the seal member 30, which is particularly easy to be elastically deformed, is configured to be in contact with the inclined surface 23 of the inner ring 20, the contact pressure between the seal member 30 and the inclined surface 23 can be reduced as compared with the case of contact in the radial direction. As a result, the compressed air-based opening-closing operation of the seal member 30 can be performed smoothly and with high responsiveness. In addition, the contact pressure can be reduced with a compressed air pressure smaller than in the structure of the related art and the rotation speed of the rotary shaft 101 can be further improved and the stop time can be shortened at the same time.

By providing the inclined portion 33 at the tip of the seal member 30 with a contact surface coming into area contact with the inclined surface 23 of the inner ring 20, the surface pressure that acts on the seal member 30 is reduced and wear is reduced. In addition, sealability is improved as a result of an increase in the contact area.

Further, the contact surface of the inclined portion 33 may be a surface coming into line contact with the inclined surface 23 of the inner ring 20. In that case, the frictional resistance is reduced as compared with the case of area contact, which is advantageous for high-speed rotation.

In a dental air turbine handpiece in particular, extremely high-speed rotation is required in grinding a tooth and a rotation stop performance as sudden as within 2 seconds, preferably within 1 second, is required in stopping. According to this configuration, the above effects of rotation speed increase and stop time shortening can be stably obtained, and thus the usability of the dental air turbine handpiece can be improved considerably.

When the dental air turbine handpiece is driven, compressed air is less likely to leak out of the bearing as compared with a seal member-less case, and thus drive noise is reduced and high quietness can be obtained.

The seal member 30 is disposed in one axial end portion on the side opposite to the compressed air inlet of the outer ring 10 although the rotary shaft 101 is provided with a pair of rolling bearings as illustrated in FIG. 5. As a result, by spray lubrication from between the pair of rolling bearings, lubricating oil can be supplied into each rolling bearing from a bearing end portion side where the seal member 30 is not disposed. In addition, since the seal member 30 is disposed on a side opposite to a spray lubrication side, liquid leakage does not occur from each rolling bearing to the outside of the head portion 122.

Dental air turbine handpieces are usually autoclaved for high-temperature cleaning and sterilization after use. Although the amount of lubricating oil in the rolling bearing decreases as a result of this treatment, the seal member 30 is disposed only in one axial end portion of the rolling bearing, and thus the lubricating oil can be easily supplied from the other end portion in the axial direction. Accordingly, the lubrication state of the rolling bearing can always be satisfactory and the rotary shaft 101 can be stably driven to rotate.

The present invention is not limited to each of the above embodiments and can be modified and improved as appropriate.

For example, although the rim portion 7 on one end side of the cage 5 used for the rolling bearing 1 of the above embodiments is disposed on the upstream side from the ball 3 in the compressed air supply direction, the present invention is not limited thereto and the rim portion 7 may be disposed on the seal member side on the opposite side in the axial direction.

Although the seal member is disposed only on one axial end side of the rolling bearing 1 and thus the groove portion 13 of the outer ring 10 and the inclined surface 23 of the inner ring 20 are formed only on one axial end side, the present invention is not limited thereto and the groove portion 13 and the inclined surface 23 may be symmetrically formed on the other axial end side as well. In that case, one of the pair of inclined surfaces is not used, and yet it is not necessary to be aware of the direction of assembly in the process of rolling bearing assembly and the work process can be simplified.

As for the seal member, a wall thickness of the inclined portion may be a constant thickness or may gradually decrease toward the inside in the radial direction. In the latter case, the thickness Skt of the inclined portion 33 in the direction perpendicular to the inclination direction is a thickness of the thickest part.

REFERENCE SIGNS LIST

1: rolling bearing
3: ball (rolling body)
5: cage
7: rim portion
10: outer ring
11: inner peripheral surface
13: groove portion
15: tapered surface
17: axial inside surface
20: inner ring
21: outer peripheral surface
23: inclined surface
30: seal member
31: base portion
33: inclined portion
35: inner peripheral surface
40: retaining ring
100: bearing unit for air turbine
120: dental air turbine handpiece
122: head portion
S: bearing internal space
Ts: circumferential gap of retaining ring at time when seal member and retaining ring are attached to groove portion of outer ring
Sct: axial thickness of part of seal member in contact with retaining ring
Lss: radial length at which both axial side surfaces of seal member are in contact with and sandwiched between retaining ring and groove portion of outer ring
$\Phi dg$: inner diameter of outer ring

The invention claimed is:

1. A rolling bearing for an air turbine comprising:
an outer ring;
an inner ring;
a plurality of rolling bodies rollably disposed between the outer ring and the inner ring; and
a substantially annular seal member provided in one axial end portion of a bearing internal space between the outer ring and the inner ring and made of an elastic body without a core metal, wherein
an outer peripheral portion of the seal member is fixed by a retaining ring to a groove portion formed on an inner peripheral surface of the outer ring in the one axial end portion and an inner peripheral portion of the seal member is elastically deformable,
the one axial end portion is on a side opposite to an inlet of compressed air supplied to the bearing internal space,
the seal member includes an inclined portion inclined toward one axial end portion side on an inner diameter side, and
$1 \leq Ts/Sc \leq 10$ is satisfied when Ts is a circumferential gap of the retaining ring at a time when the seal member and the retaining ring are attached to the groove portion of the outer ring and Sct is an axial thickness of a part of the seal member in contact with the retaining ring.

2. The rolling bearing for an air turbine according to claim 1, wherein $0.018 \leq Lss/\Phi dg \leq 0.093$ is satisfied when $\Phi dg$ is an inner diameter of the outer ring and Lss is a radial length at which both axial side surfaces of the seal member are in contact with and sandwiched between the retaining ring and the groove portion of the outer ring.

3. The rolling bearing for an air turbine according to claim 1, wherein an outer peripheral surface of the inner ring includes an inclined surface, and the inclined portion of the seal member is capable of being in contact with the inclined surface of the inner ring.

4. The rolling bearing for an air turbine according to claim 3, wherein the inclined portion of the seal member is capable of being in area contact with the inclined surface of the inner ring.

* * * * *